(12) United States Patent
Hoppe et al.

(10) Patent No.: US 10,672,365 B2
(45) Date of Patent: Jun. 2, 2020

(54) ADDRESS LOCATION ASSISTANCE SYSTEM AND ASSOCIATED METHODS

(71) Applicant: JERS Tech, LLC, Tappan, NY (US)

(72) Inventors: Stephen Hoppe, Closter, NJ (US); Richard Altemus, Encino, CA (US); Jesse Campo, Encino, CA (US); Eric Arndt, Newark, DE (US)

(73) Assignee: JERS Tech, LLC, Tappan, NY (US)

( * ) Notice: Subject to any disclaimer, the term of this patent is extended or adjusted under 35 U.S.C. 154(b) by 0 days.

(21) Appl. No.: 15/999,130

(22) Filed: Aug. 17, 2018

(65) Prior Publication Data

US 2019/0057674 A1 Feb. 21, 2019

Related U.S. Application Data

(60) Provisional application No. 62/546,585, filed on Aug. 17, 2017.

(51) Int. Cl.
| | |
|---|---|
| *G09G 5/10* | (2006.01) |
| *G09G 5/00* | (2006.01) |
| *G06F 1/26* | (2006.01) |
| *G06F 16/29* | (2019.01) |
| *G06F 16/9537* | (2019.01) |

(Continued)

(52) U.S. Cl.
CPC ............ *G09G 5/10* (2013.01); *G06F 1/26* (2013.01); *G06F 3/147* (2013.01); *G06F 16/29* (2019.01); *G06F 16/9537* (2019.01); *G06Q 50/28* (2013.01); *G09G 5/006* (2013.01); *G09G 2320/0626* (2013.01); *G09G 2356/00* (2013.01); *G09G 2370/16* (2013.01); *G09G 2380/06* (2013.01)

(58) Field of Classification Search
CPC ............... G09G 5/10; G09G 2380/06; G09G 2320/0626; G09G 2370/16; G09G 5/006; G06F 16/9537; G06F 16/29; G06F 1/26; G06Q 50/28
See application file for complete search history.

(56) References Cited

U.S. PATENT DOCUMENTS

| | | | |
|---|---|---|---|
| 5,727,057 A | 3/1998 | Emery et al. | |
| 6,122,520 A | 9/2000 | Want et al. | |

(Continued)

FOREIGN PATENT DOCUMENTS

| | | |
|---|---|---|
| CA | 2927122 | 2/2013 |
| CN | 102918874 A | 2/2013 |

(Continued)

*Primary Examiner* — Aneeta Yodichkas
(74) *Attorney, Agent, or Firm* — Mark Malek; Paul J. Ditmyer; Widerman Malek, PL (57) ABSTRACT

The present invention is directed to a location or address identification system and method including an on-site electronic location identification display device in communication with a software application to assist response or delivery times of a driver. Hardware and software are provided to communicate, display and clearly identify the delivery location. Various components of the embodiments include wireless communication-enabled hardware, RF technology, web application software and network connectivity. A programmable electronic display device syncs with another device to provide an illuminated signal, indicating the street address or location, to a delivery driver or emergency responder.

20 Claims, 3 Drawing Sheets

(51) Int. Cl.
*G06Q 50/28* (2012.01)
*G06F 3/147* (2006.01)

(56) References Cited

U.S. PATENT DOCUMENTS

| | | |
|---|---|---|
| 7,593,718 B2 | 9/2009 | Gorday et al. |
| 7,937,067 B2 | 5/2011 | Maier et al. |
| 8,050,386 B2 | 11/2011 | Dickinson |
| 8,089,405 B2 | 1/2012 | Piersol et al. |
| 8,200,247 B1 | 6/2012 | Starenky et al. |
| 8,477,910 B2 | 7/2013 | Feldman et al. |
| 8,559,974 B2 | 10/2013 | Alizadeh-Shabdiz et al. |
| 8,711,034 B2 | 4/2014 | Piersol et al. |
| 8,719,180 B2 | 5/2014 | Biasi et al. |
| 8,918,075 B2 | 12/2014 | Maier et al. |
| 8,929,918 B2 | 1/2015 | Siomina et al. |
| 9,109,903 B2 | 8/2015 | Wu et al. |
| 9,125,022 B2 | 9/2015 | DiAcetis et al. |
| 9,137,771 B2 | 9/2015 | Wrappe |
| 9,204,257 B1 | 12/2015 | Mendelson |
| 9,244,149 B2 | 1/2016 | Piersol et al. |
| 9,282,436 B2 | 3/2016 | Chitre et al. |
| 9,369,845 B2 | 6/2016 | Alizadeh-Shabdiz et al. |
| 9,467,832 B2 | 10/2016 | Haney |
| 9,491,575 B2 | 11/2016 | Edge et al. |
| 9,544,721 B2 | 1/2017 | Jouaux et al. |
| 9,641,982 B2 | 5/2017 | Kontturi |
| 9,753,117 B2 | 9/2017 | Snapp |
| 2003/0057270 A1 | 3/2003 | Collen |
| 2005/0090225 A1 | 4/2005 | Muehleisen et al. |
| 2015/0301150 A1 | 10/2015 | Stuckman et al. |
| 2016/0323754 A1 | 11/2016 | Friday et al. |
| 2017/0193442 A1 * | 7/2017 | Ekkel ................ G06Q 10/083 |

FOREIGN PATENT DOCUMENTS

| | | |
|---|---|---|
| EP | 247911 A1 | 7/2012 |
| EP | 3010256 A1 | 4/2016 |
| WO | WO 2006110181 A2 | 10/2006 |
| WO | WO 2016118134 A1 | 7/2016 |

* cited by examiner

ADDRESS LOCATION ASSISTANCE SYSTEM AND ASSOCIATED METHODS

FIELD OF THE INVENTION

The present invention relates to systems and methods for assisting a human driver in locating an address or specific location.

BACKGROUND

Various location assistance systems and devices are known. For example, The Global Positioning System (GPS) is a space-based radio-navigation system owned by the United States government and operated by the United States Air. Force. It is a global navigation satellite system that provides geolocation and time information to a GPS receiver anywhere on or near the earth where there is an unobstructed line of sight to four or more GPS satellites.

The GPS system does not require the user to transmit any data, and it operates independently of any telephonic or Internet reception, though these technologies can enhance the usefulness of the GPS positioning information.

Also, U.S. Published Patent Application No. 2015/0301150 to Stuckman et al, is directed to a delivery beacon device that is used by a customer to receive one or more drone deliveries. A user places the beacon device, which communicates via a network, in a desired delivery location at their service address. The beacon device generates a visible beacon that can be used by a drone delivery device or other delivery, drone to more precisely locate the delivery location at the service address.

However, there is still a need for assistance to a human driver for delivery, emergency or other services to help easily identify an address or location and reduce time required to navigate and locate the address or location.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems, devices and methods for assisting a driver in locating an address or specific location.

Embodiments are directed to a system and method to improve location or address identification including an on-site electronic location identification display device operating in communication over a network with a software application to assist response or delivery times of a driver with reduced reliance on maps, phone calls or geo-location devices.

The approach includes hardware and software to communicate, display and clearly identify the location of a home, apartment, business or any other establishment. Various components of the embodiments include wireless communication (e.g. Bluetooth, Wi-Fi etc.) enabled hardware, RF technology, web application software and network (e.g. internet) connectivity which may be generally configured with a programmable electronic display device (e.g. LED, LCD or lights) that syncs with another Wi-Fi enabled device (e.g. phone, tablet, computer via a router) through internet connectivity to provide an illuminated signal, indicating the street address or location, to a delivery driver or emergency responder, for example.

An embodiment is directed to an on-site location identification display device for use with a delivery service system that includes a human delivery driver instructed to locate a selected delivery location. The display device includes a frame or housing, a controllable illuminating electronic display including a light source, carried by the frame, and configured to display a location identifier, and a control unit coupled to the controllable illuminating electronic display and configured to selectively control the controllable illuminating electronic display to illuminate and increase visibility of the location identifier, via the light source, to the human delivery driver based upon a proximity of the human delivery driver reaching a proximity threshold. A wireless communication interface is coupled to the control unit and configured to communicate data with an external local user computing device, a power unit is carried by the frame and configured to provide power to the controllable illuminating electronic display, the control unit and the wireless communication device. A location mounting device is associated with the frame and configured to mount the frame at the selected delivery location.

Additionally, and/or alternatively, the location identifier of the controllable illuminating electronic display is a street address.

Additionally, and/or alternatively, the wireless communication interface includes at least one of a cellular transceiver, a Bluetooth transceiver, a WiFi transceiver, and a ZigBee transceiver.

Additionally, and/or alternatively, the power unit comprises at least one of a battery power unit, a solar power unit, and a wired power unit.

Additionally, and/or alternatively, the light source of the controllable illuminating electronic display comprises at least one of a light emitting diode (LED), liquid crystal display (LCD) and an incandescent light bulb.

Additionally, and/or alternatively, the control unit is configured to selectively control the controllable illuminating electronic display to illuminate and increase visibility of the location identifier using visual effects including increasing a brightness of the location identifier and/or blinking the location identifier, using the light source.

An embodiment is directed to a delivery service system that includes the use of a human delivery driver instructed to locate a selected delivery location, the system including an on-site location identification display device including a controllable illuminating electronic display including a light source, carried by the frame, and configured to display a location identifier. A control unit is coupled to the controllable illuminating electronic display and configured to selectively control the controllable illuminating electronic display to illuminate and increase visibility of the location identifier, via the light source, to the human delivery driver based upon a proximity of the human delivery driver reaching a proximity threshold. A wireless communication interface is coupled to the control unit and configured to communicate data with an external local user computing device. A power unit is carried by the frame and configured to provide power to the controllable illuminating electronic display, the control unit and the wireless communication device, and a location mounting device associated with the frame and configured to mount the frame at the selected delivery location. A computing device operates a delivery service application and includes a wireless communication unit configured to communicate delivery service data, including delivery driver location proximity data, with the display device.

An embodiment is directed to a method for on-site location identification display within a delivery service system that includes a human delivery driver instructed to locate a selected delivery location. The method includes: providing an illuminating electronic display, having alight source to display a location identifier, including mounting the illuminating electronic display at the selected delivery location; providing power to the illuminating electronic display; tracking a proximity of the delivery driver; wireless communicating delivery driver proximity data to the illuminating electronic display; and selectively controlling the illuminating electronic display to illuminate and increase visibility of the location identifier, via the light source, to the human delivery driver based upon the proximity of the human delivery driver reaching a proximity threshold.

Additionally, and/or alternatively, the illuminating electronic display comprises a housing and an associated mounting device. Also, the location identifier of the controllable illuminating electronic display may be a street address.

Additionally, and/or alternatively, wireless communicating comprises the use of at least one of a cellular transceiver, a Bluetooth transceiver, a WiFi transceiver, and a ZigBee transceiver.

Additionally, and/or alternatively, providing power comprises the use of et least one of a battery power unit, a solar power unit, and a wired power unit.

Additionally, and/or alternatively, the light source of the controllable illuminating electronic display comprises at least one of a light emitting diode (LED), liquid crystal display (LCD) and an incandescent light bulb.

Additionally, and/or alternatively, selectively controlling the illuminating electronic display includes illuminating and increasing visibility of the location identifier using visual effects including at least one of increasing a brightness of the location identifier and blinking the location identifier, using the light source.

So, the embodiments of the invention can be used in connection with the delivery of goods or services, to inform emergency services exactly where they're going and clearly indicate a street address for any other purpose. A goal is to improve delivery times, EMS response times and otherwise help identify a street address. Power for the on-site electronic device may be provided by hardwire, battery and/or solar panel. The device may be mounted or otherwise positioned at the address/location via any appropriate mechanical feature (e.g. posts, stakes, suction cups, screws, etc.).

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers, refer to like elements throughout.

With reference to FIGS. 1-5, the system, device and method will be described. The inter-connected system or ecosystem includes an illuminated street address number sign, and applications that use wireless and wired network communications (e.g. local area network and Internet connectivity), global positioning software, and network based servers that aid human delivery and/or emergency services in the process of identifying a specific location. The illuminated street address number sign is capable of displaying the street address number(s) in association with specific global coordinates to help easily identify and reduce the time required to navigate to a particular location by human delivery services and/or emergency services.

The system, including the illuminated street address number sign, is capable of tracking the location of the human delivery/service driver (delivery and/or emergency service) that is requested by a user at a location. The ecosystem begins with a service request/order confirmed by the user through an application (e.g. web based application) which is then acknowledged by the service through the network (including a network based server, for example) to begin communication with the illuminated street address number sign, and a mobile device application used by the driver to begin guidance to the location. Once the service request is ready to leave its origin, the driver is provided with a link via the network to the location through an application. The driver is then switched into route guidance through mapping software and the network may be then granted access to the location of the driver. The user device or display device is then provided with the location of the driver. Once the driver is within a certain proximity (predetermined distance as desired) of the location, the street address number sign will illuminate. When the driver is within visual range of the location, the sign may begin to pulse the lighted street address number to provide better awareness to the driver. Of course, other visual effects may be included in addition to or as an alternative to the pulsing.

The service may also be granted continual access to the location of the driver through the network to better manage the efficiency of the subsequent service requests the driver may receive and complete. The network may be capable of supporting the management of delivery/emergency service requests and can be customized to the needs of the service to work efficiently. Once the driver has completed the service request, the sign may power off or go into sleep mode.

As an option, when desired to support the driver in completing the service request, the user can be prompted through the application to authenticate, for example with a digital signature and/or fingerprint technology, through network which will confirm with a message (or symbol) on the driver device to securely leave the service request package at the location of the sign. A universally accepted symbol may be used as a way of approving any delivery service to leave a package without the need of signature.

The display device can be available in various designs to better suit its location both aesthetically and functionally. For example, the sign may include a hanging chain, window installation, base, or it may be mounted to a secure smart lock box to accept packages which will communicate through the network with the user via the application and user device.

Figure 1:
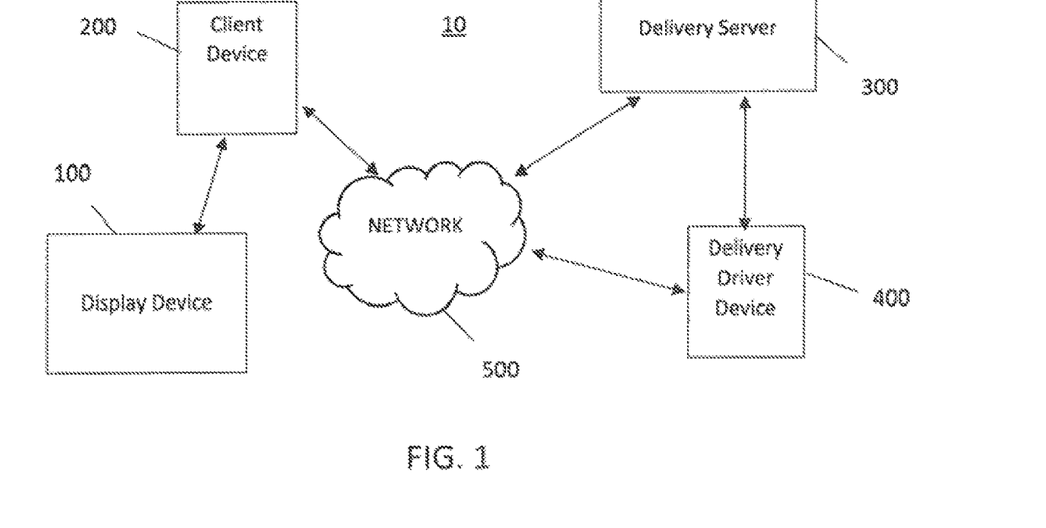
FIG. 1 is a schematic illustration of a system and network with an illuminated display device according to an embodiment of the present invention.

FIG. 1 is a schematic illustration of a system 10 including a network 500 with an illuminated display device 100 according to an embodiment of the present invention. A delivery server 300 and example devices, client device 200 and delivery driver device 400, operate in accordance with the present embodiments. The delivery server 300 communicates with a client device 200, such as a mobile terminal 210 or personal computer 220 (FIGS. 4A and 4B) via the network 500. The network 500 can include a single network or a plurality of different networks. These network(s) can include the Internet, a private communication network, a local area network, a mobile wireless communication network, a wired or fiber optic network or other broadband communication network, for example.

The delivery server 300 can present a website that operates via a browser application of mobile terminal 210 and/or personal computer 220 or that otherwise provides a server application that operates in conjunction with a client device having an application such as a mobile application selected for download by the user and downloaded to the client device to present and gather delivery data that includes user data and delivery preferences, delivery location data that indicates a location for deliveries, delivery confirmation data and other data.

For example, a customer/subscriber can log into the delivery server 300 via an email address or other login ID, and password to access account information, enter preferences and payment information and other information pertaining to delivery services. In an embodiment, the delivery server 300 may communicate with one or more content servers corresponding to retailers that are the source of goods to be delivered. The content servers 12 can include a map server that provides map data, image data such as sky view or street view data or other map or image data that is correlated to GPS coordinates or addresses.

Figure 2:
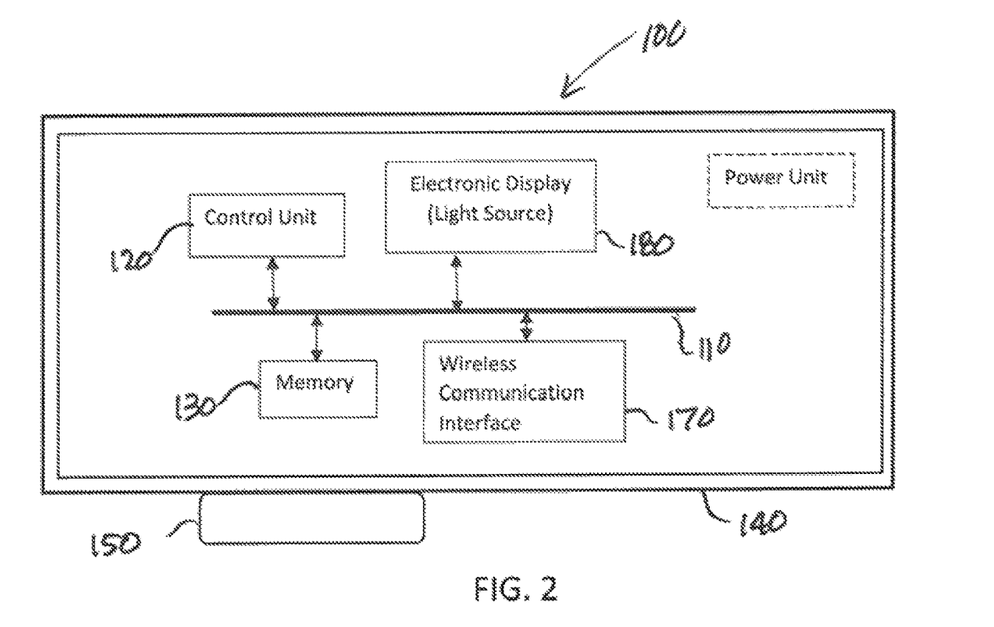
FIG. 2 is a schematic illustration of a display device for use with the system of FIG. 1.

FIG. 2 is a diagram of example components of a display device 100. As shown in FIG. 2, device 100 may include a bus 110, a control unit or processor 120, a memory 130, a wireless communication interface 170 and a electronic display 180. A frame or housing (or any structural support for the components) 140 may carry or house the components, and a location mounting device 150 (e.g. bracket, hanger, stake, post, etc.) may be associated with the frame 140 to mount the frame at a delivery location. A power unit 160 provides power to the device 100. The power unit may be a battery power unit, a solar power unit, and/or a wired power unit.

An input component, such as a user input (e.g., components of a touch screen display, a keyboard, a keypad, a mouse, a button, a switch, a microphone, etc.), or a sensor for sensing information (e.g., a geo-location module such as a global positioning system (GPS) component, an accelerometer, a gyroscope, an actuator, etc.) may also be included. An output component may provide output information from device 100 (e.g., a speaker, one or more light-emitting diodes (LEDs), etc.). One or more antennas for wireless communication may also be included as would be appreciated by those skill in the art.

Bus 110 may include a component that permits communication among the components of device 1300. Control unit 120 is implemented in hardware, firmware, or a combination of hardware and software. Control unit 120 may include a processor (e.g., a central processing unit (CPU), a graphics processing unit (GPU), an accelerated processing unit (APU), etc.), a microprocessor, and/or any processing component (e.g., afield-programmable gate array (FPGA), an application-specific integrated circuit (ASIC), etc.) that interprets and/or executes instructions. In some implementations, control unit 120 may include one or more processors capable of being programmed to perform a function.

Such processors can include a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a Memory, such as memory 130. The memory can include a hard disc drive or other disc drive, read-only memory, random access memory, volatile memory, non-volatile memory, static memory, dynamic memory, flash memory, cache memory, and/or any device that stores digital information. Note that when a processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 110, other architectures are possible including additional data buses and/or direct connectivity between one or more elements. Further, the device 100 can include one or more additional elements that are not specifically shown.

Communication interface 170 may include a transceiver-like component (e.g., a transceiver, a separate receiver and transmitter, etc.) that enables device 100 to communicate with other devices, such as via a wired connection, a wireless connection, or a combination of wired and wireless connections. Communication interface 170 may permit device 100 to receive information from another device and/or provide information to another device. For example, communication interface 170 may include an Ethernet interface, an optical interface, a coaxial interface, an infrared interface, a radio frequency (RF) interface; a universal serial bus (USB) interface; a Wi-Fi interface, a cellular network interface, or the like.

The electronic display 180 may be a digital display, for example, an LCD, LED, plasma display, touch screen or any other digital display capable of communicating information including static characters or information as well as displaying images and/or video, for example.

Device 100 may perform one or more processes described herein. Device 100 may perform these processes in response to the control unit 120 executing software instructions stored by a non-transitory computer-readable, medium, such as memory 130 and/or another storage component. A computer-readable medium is defined herein as a non-transitory memory device. A memory device includes memory space within a single physical storage device or memory space spread across multiple physical storage devices.

Software instructions may be read into memory 130 from another computer-readable medium or from another device via communication interface 170. When executed, software instructions stored in memory 130 may cause control unit 120 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 100 may include additional components, fewer components, different components, or differently arranged components, than those shown in FIG. 2. Additionally, or alternatively, a set of components (e.g., one or more components) of device 100 may perform one or more functions described as being performed by another set of components of device 100.

Figure 3:
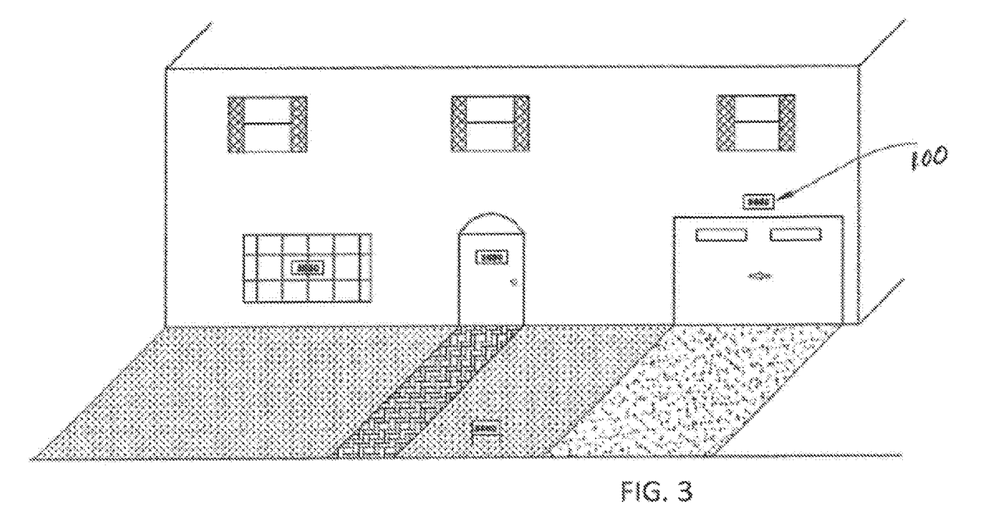
FIG. 3 is a schematic illustration of a user's house with the illuminated display device of FIG. 2.

FIG. 3 is a schematic illustration of a users house with the illuminated display device 100 of FIG. 2. The electronic display 180 or illuminated street address number sign is capable of displaying the street address number(s) in association with specific global positioning coordinates to help easily identify and reduce the time required to navigate to a particular location by human delivery driver and/or emergency services, driver.

Figure 4A:
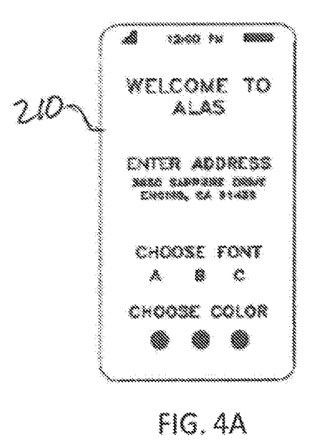
FIGS. 4A and 4B are a schematic illustrations of example user devices (client devices) for use with the system of FIG. 1.
Figure 4B:
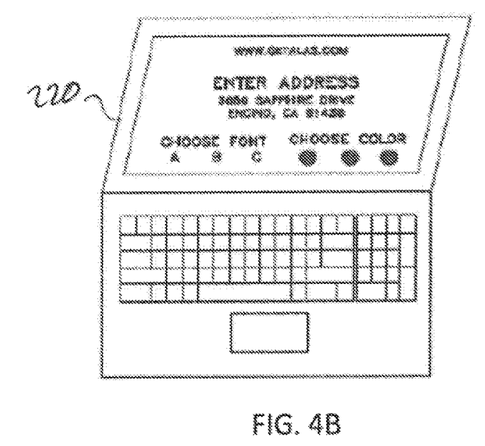

FIGS. 4A and 4B present example representations of a client device 200 in accordance with present embodiments. In particular, the client device 200 may be a mobile terminal 210, personal computer 20 or other client device such as a personal digital assistant, e-reader, tablet, or smartphone. The client device 200 may include a network interface such as a wireless interface such as a 3G, 4G, LTE or other wireless telephony transceiver, a Bluetooth transceiver, a WiFi transceiver, UltraWideBand transceiver, WIMAX transceiver, ZigBee transceiver or other wireless interface. Examples of interfaces further include wired interfaces such as a Universal Serial Bus (USB) interface, an IEEE 1394. Firewire interface, an Ethernet interface or other network card or modem for communicating with delivery server 300, or other servers. The client device 200 may also includes a user interface such as a display device, touch screen, key pad, touch pad, thumb wheel, one or more buttons, a speaker, a microphone, an accelerometer, gyroscope or other motion or position sensor, or other interface devices that provide information to a user of the client device 200 and that generate data in response to the users interaction with the client device 200, as would be appreciated by those skilled in the art. In addition, the client device 100 may Include an image capture device such as a digital camera that captures still or video images with or without associated audio.

The client device 200 may also include a processing module and associated memory module that stores an operating system such as a Linux-based operating system, a Microsoft personal computer or mobile operating system, an Android operating system, an Apple mobile or personal computer operating system or other operating system. The memory module may also store location data corresponding to the location of the client device 200 generated via user interaction, for example, via an optional Global Positioning System (GPS) receiver.

The client device may store a delivery client application which can be a general browser application such as Mozilla, Google Chrome, Safari. Internet Explorer or other general web browser or an application that is customized to operate in conjunction with delivery server 300 in conjunction with the exchange of delivery data.

FIGS. 4A and 4B present a graphical representation of screen display, for example, as generated by a delivery client application in response to delivery data from the delivery server. As shown, a set up screen may be presented to a user. Delivery location data received from the client device 200 indicates a service address associated with a user of the client device and a delivery location associated with the service address for receiving at least one delivery to the service address. The screen display is one in a number of different screen displays that guide the user in entering delivery location data and other data relating to delivery services for the user in conjunction with either a particular delivery or with respect to one or more future deliveries at a particular service address. It should be noted that the particular menu structure, screen layout and options are merely illustrative of the many types of delivery data that can be presented and could be selected in accordance with various present embodiments.

Figure 5A:
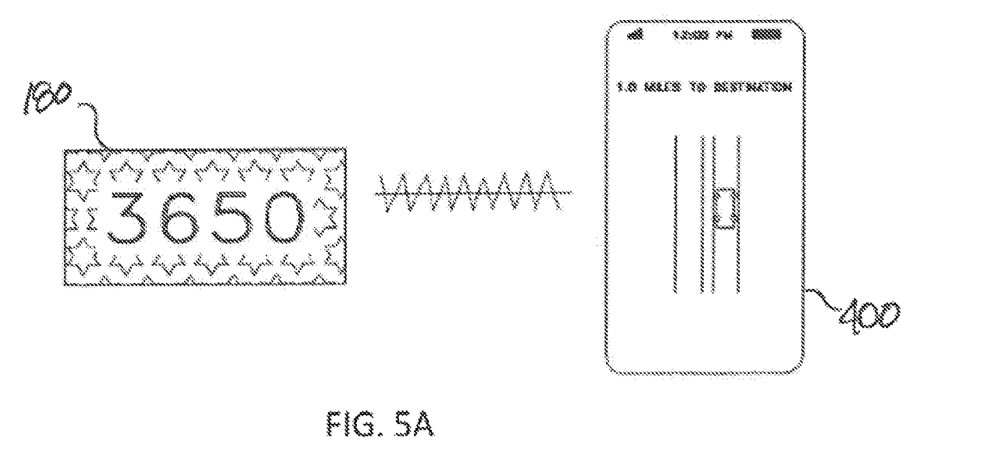
FIGS. 5A and 5B are schematic illustrations of the delivery driver device linked to the illuminated display device in the system of FIG. 1.
Figure 5B:
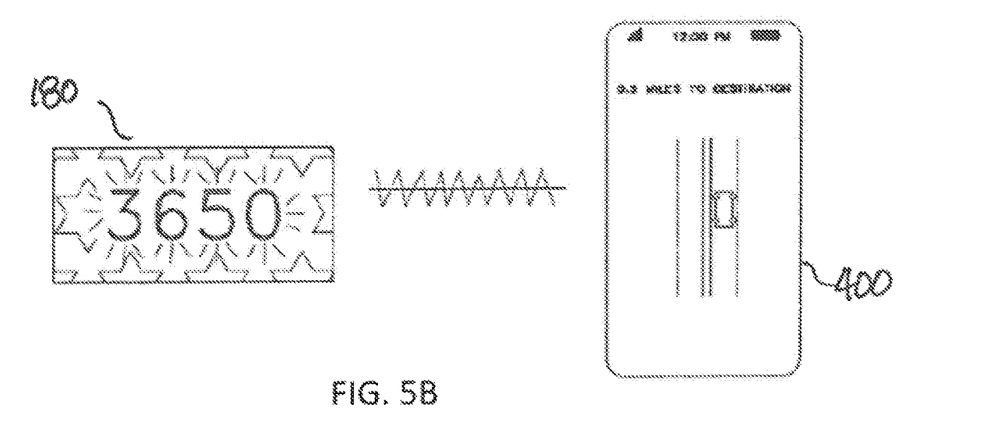

Referring additionally to FIGS. 5A and 5B, the client device 200 or display device 100 is, provided with the location of the driver. Once the driver is within a certain proximity (predetermined distance as desired) of the location, the electronic display 180 (street address number sign) will Illuminate or increase the brightness of the light source, for example. When the driver using the delivery driver device 400 is within visual range of the location, the sign 180 may begin to blink or pulse the lighted street address number to provide better awareness to the driver. Of course, other visual effects may be included in addition to or as an alternative to the blinking or pulsing.

The sign, user device, network server, delivery system, delivery driver mobile device and other components may be part of, and/or communicate with, a smart-home system or network that may provide automated control of devices, appliances and other home systems (such as security systems, lighting systems, wired/wireless communication systems etc.), and may include the use of Internet of Things (IoT) technology, various input/output interfaces, Internet connectivity, and/or remote control capabilities etc., for example.

The sign, user device, network server, delivery system, delivery driver mobile device and other components may be implemented by one or more processors or computers. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or arty combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereat Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary, embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

That which is claimed is:

1. An on-site location identification display device for use with a delivery service system that includes a human delivery driver instructed to locate a selected delivery location, the display device comprising:
   a frame;
   a controllable illuminating electronic display including a light source, carried by the frame, and configured to display a location identifier;
   a control unit coupled to the controllable illuminating electronic display and configured to selectively control the controllable illuminating electronic display to illuminate and increase visibility of the location identifier, via the light source, to the human delivery driver based upon a proximity of the human delivery driver reaching a proximity threshold;
   a wireless communication interface coupled to the control unit and configured to communicate data with an external local user computing device;

a power unit carried by the frame and configured to provide power to the controllable illuminating electronic display, the control unit and the wireless communication device; and a location mounting device associated with the frame and configured to mount the frame at the selected delivery location.

2. The on-site location identification display device of claim 1, wherein the frame comprises a housing.

3. The on-site location identification display device of claim 1, wherein the location identifier of the controllable illuminating electronic display comprises a street address.

4. The on-site location identification display device of claim 1, wherein the wireless communication interface comprises at least one of a cellular transceiver, a Bluetooth transceiver, a WiFi transceiver, and a ZigBee transceiver.

5. The on-site location identification display device of claim 1, wherein the power unit comprises at least one of a battery power unit, a solar power unit, and a wired power unit.

6. The on-site location identification display device of claim 1, wherein the light source of the controllable illuminating electronic display comprises at least one of a light emitting diode (LED), liquid crystal display (LCD) and an incandescent tight bulb.

7. The on-site location identification display device of claim 1, wherein the control unit is configured to selectively control the controllable illuminating electronic display to illuminate and increase visibility of the location identifier using visual effects including at least one of increasing a brightness of the location identifier and blinking the location identifier, using the light source.

8. A delivery service system that includes the use of a human delivery driver instructed to locate a selected delivery location, the system comprising:
  an on-site location identification display device including
    a frame,
    a controllable illuminating electronic display including a light source, carried by the frame, and configured to display a location identifier,
    a control unit coupled to the controllable illuminating electronic display and configured to selectively control the controllable illuminating electronic display to illuminate and increase visibility of the location identifier, via the light source, to the human delivery driver based upon a proximity of the human delivery driver reaching a proximity threshold,
    a wireless communication interface coupled to the control unit and configured to communicate data with an external local user computing device,
    a power unit carried by the frame and configured to provide power to the controllable illuminating electronic display, the control unit and the wireless communication device, and
    a location mounting device associated with the frame and configured to mount the tattle at the selected delivery location;
  a computing device running a delivery service application and including a wireless communication unit configured to communicate delivery service data, including delivery driver location proximity data, with the display device.

9. The delivery service system of claim 8, wherein the location identifier of the controllable illuminating electronic display comprises a street address.

10. The delivery service system of claim 8, wherein the wireless communication interface comprises at least one of a cellular transceiver, a Bluetooth transceiver, a WiFi transceiver, and a ZigBee transceiver.

11. The delivery service system of claim 8, wherein the power unit comprises at least one of a battery power unit, a solar power unit, and a wired power unit.

12. The delivery service system of claim 8, wherein the light source of the controllable illuminating electronic display comprises at least one of a light emitting diode (LED), liquid crystal display (LCD) and an incandescent light bulb.

13. The delivery service system of claim 8, wherein the control unit is configured to selectively control the controllable illuminating electronic display to illuminate and Increase visibility of the location identifier using visual effects including at least one of increasing a brightness of the location identifier and blinking the location identifier, using the light source.

14. A method for on-site location identification display within a delivery service system that includes a human delivery driver instructed to locate a selected delivery location, the method comprising:
  providing an illuminating electronic display, having a light source to display a location identifier, including mounting the illuminating, electronic display at the selected delivery location;
  providing power to the illuminating electronic display;
  tracking a proximity of the delivery driver;
  wireless communicating delivery driver proximity data to the illuminating electronic display; and
  selectively controlling the illuminating electronic display to illuminate and increase visibility of the location identifier, via the light source, to the human delivery driver based upon the proximity of the human delivery driver reaching a proximity threshold.

15. The method of claim 14, wherein the illuminating electronic display comprises a housing and an associated mounting device.

16. The method of claim 14, wherein the location identifier of, the controllable illuminating electronic display comprises a street address.

17. The method of claim 14, wherein wireless communicating comprises the use of at least one of a cellular transceiver, a Bluetooth transceiver, a WiFi transceiver, and a ZigBee transceiver.

18. The method of claim 14, wherein providing power comprises the use of at least one of a battery power unit, a solar power unit, and a wired power unit.

19. The method of claim 14, wherein the light source of the controllable illuminating electronic display comprises at least one of a light emitting diode (LED), liquid crystal display (LCD) and an incandescent light bulb.

20. The method of claim 14, wherein selectively controlling the illuminating electronic display includes, illuminating and increasing visibility of the location identifier using visual effects including at least one of increasing a brightness of the location identifier and blinking the location identifier, using the light source.

* * * * *